Nov. 5, 1935.   L. D. NILSON   2,019,991
HEATING APPARATUS FOR AUTOMOTIVE VEHICLES
Filed Dec. 5, 1929   4 Sheets-Sheet 2

INVENTOR
LEONARD D. NILSON
By
ATTORNEYS

Nov. 5, 1935.  L. D. NILSON  2,019,991
HEATING APPARATUS FOR AUTOMOTIVE VEHICLES
Filed Dec. 5, 1929  4 Sheets-Sheet 3
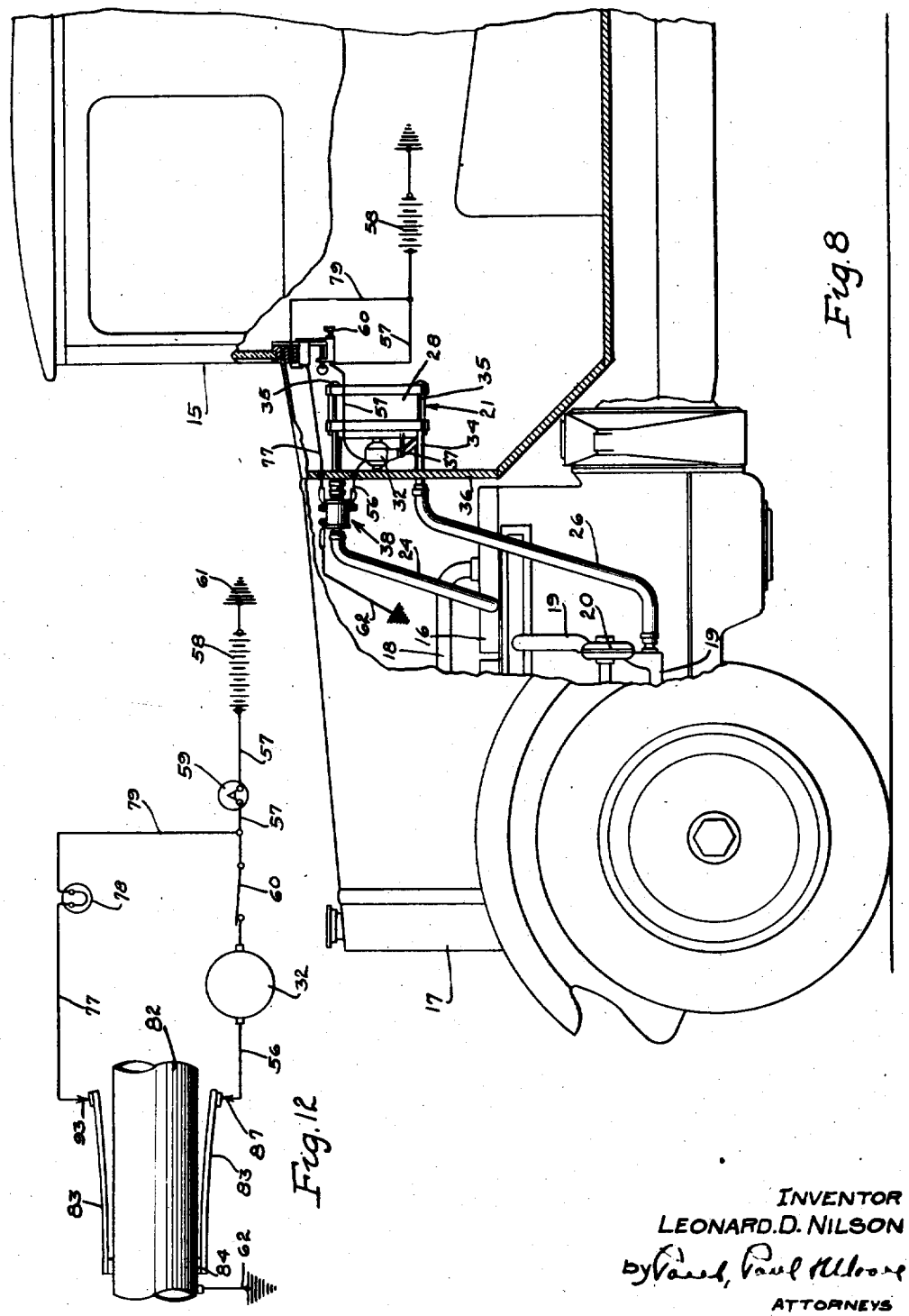
INVENTOR
LEONARD D. NILSON
ATTORNEYS Nov. 5, 1935.                L. D. NILSON                2,019,991
           HEATING APPARATUS FOR AUTOMOTIVE VEHICLES
                     Filed Dec. 5, 1929           4 Sheets-Sheet 4
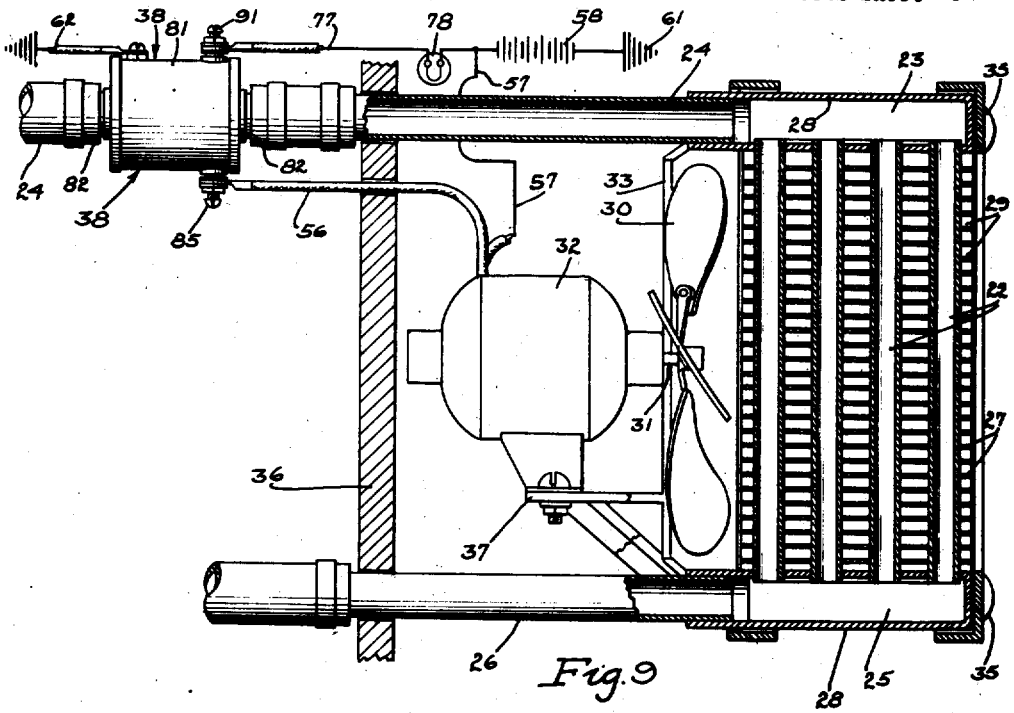
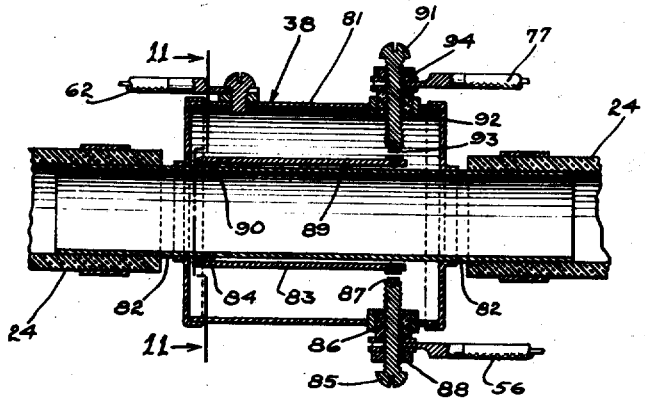 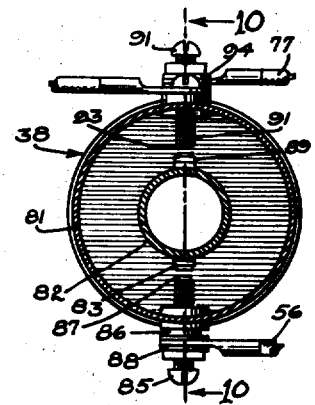
INVENTOR
LEONARD D. NILSON
ATTORNEYS Patented Nov. 5, 1935

2,019,991

UNITED STATES PATENT OFFICE 2,019,991

HEATING APPARATUS FOR AUTOMOTIVE VEHICLES

Leonard D. Nilson, Minneapolis, Minn., assignor to Tropic-Aire, Incorporated, Minneapolis, Minn., a corporation of Delaware Application December 5, 1929, Serial No. 411,863

1 Claim. (Cl. 237—12.3)

This invention relates to a heating apparatus for automotive vehicles, and the general object of the invention is to provide a heating apparatus which will present certain improvements over the disclosures of the reissue patent to Caesar, No. 17,131, granted November 13, 1928.

In the Caesar patent above mentioned there is a radiator in the driver's compartment or in the passenger compartment to which heat is supplied by means of connections from the water circulating cooling system of the engine. There is also a motor driven fan associated with the radiator for disseminating the radiated heat. The main object of this invention is to provide a first thermostatic means responsive to heat supply and which will control the motor to prevent the fan operation unless the water is sufficiently hot, and to provide a second thermostatic means also responsive to the heat supply and controlling a signal for indicating to the driver that the water is too hot.

Other objects and advantages of the invention will become apparent from the full disclosure thereof now to be made, it being understood that the disclosure herein is merely illustrative and intended in no sense as limiting, changes in details of construction and arrangement of parts being permissible so long as within the spirit of the invention and the scope of the claim which follows.

In the accompanying drawings forming a part of this specification,

Fig. 7 is a diagrammatic view of the wiring system for the thermostatic mechanisms;

Fig. 8 is a side elevational view of a heating apparatus of modified construction having the features of the invention, disclosing said apparatus applied to an automotive vehicle;

Fig. 9 is an enlarged sectional view of the heating element of the apparatus of Fig. 8, disclosing the unit housing the thermostatic mechanisms in elevation;

Fig. 10 is a detail longitudinal sectional view of the thermostatic mechanisms of the heating apparatus of Figs. 8 and 9, taken as on line 10—10 in Fig. 11;

Fig. 11 is a detail transverse sectional view of said thermostatic mechanisms of Figs. 8 and 9, taken as on line 11—11 in Fig. 10; and Fig. 12 is a diagrammatic view of the wiring system for the thermostatic mechanisms of the heating apparatus of Figs. 8 to 11.

Figure 1:
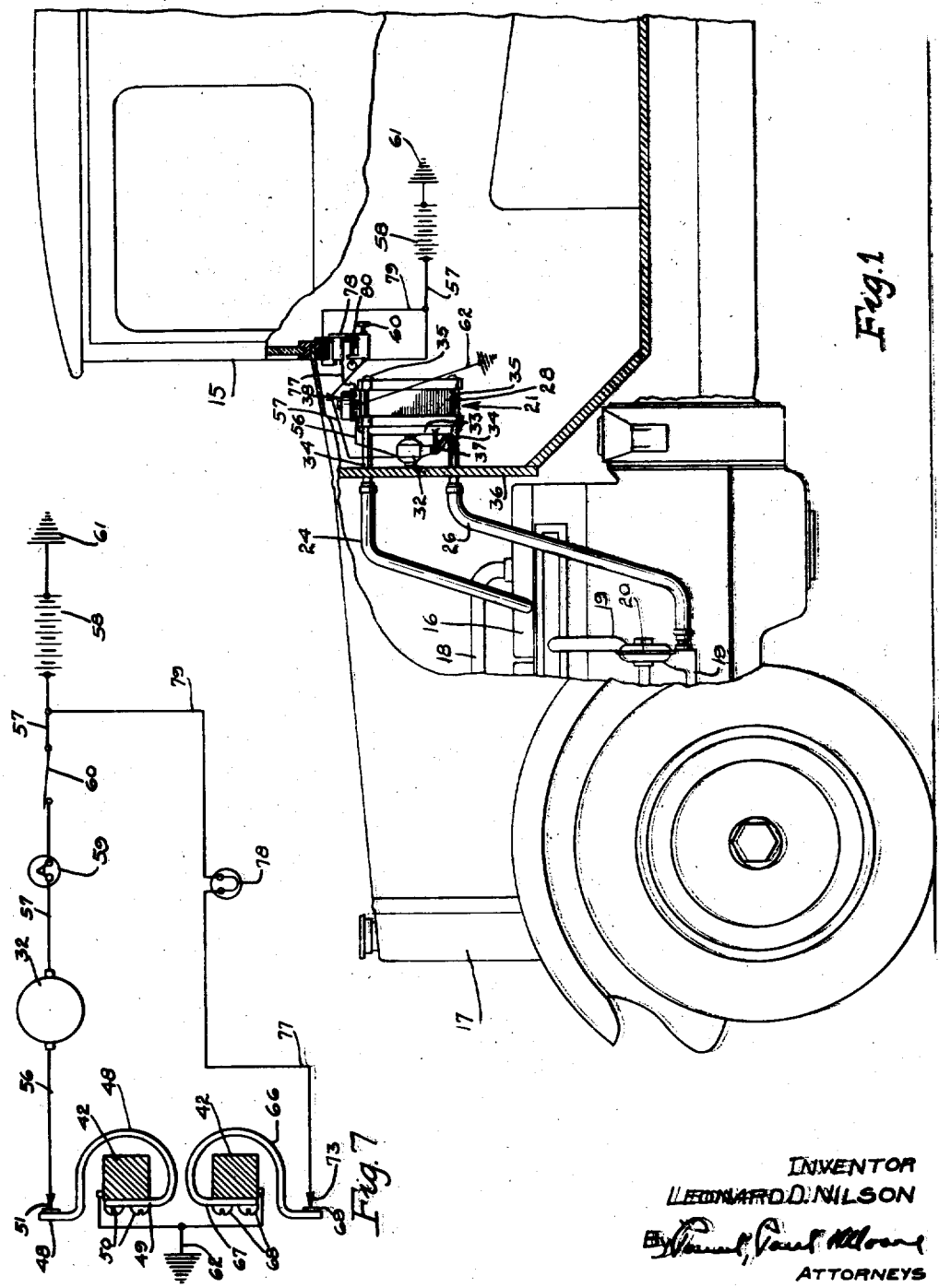
Fig. 1 is a side elevational view of a heating apparatus having the features of the invention, disclosing said apparatus applied to an automotive vehicle.
Figure 2:
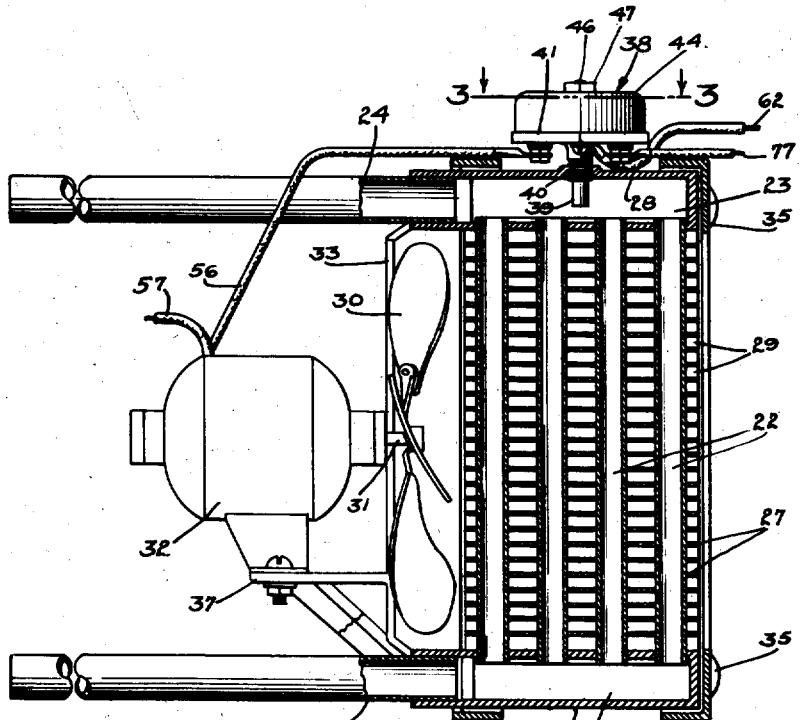
Fig. 2 is an enlarged sectional view of the heating element of the apparatus, disclosing the unit housing the thermostatic mechanisms in elevation.
Figure 4:
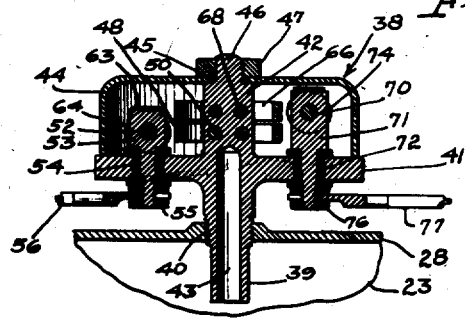
Fig. 4 is a sectional view of the thermostatic mechanisms, taken as on line 4—4 in Fig. 3.
Figure 3:
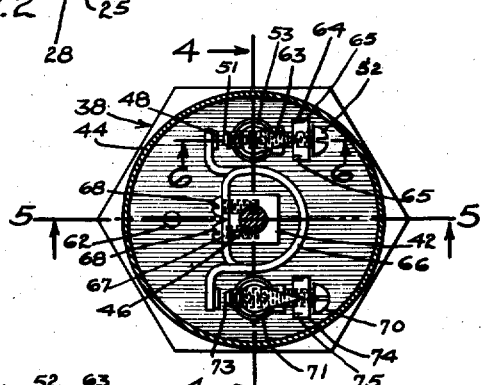
Fig. 3 is an enlarged sectional view of the thermostatic mechanisms of the heating apparatus, taken as on line 3—3 in Fig. 2, but turned at an angle of 90° from the position in said Fig. 2.
Figures 5, 6:
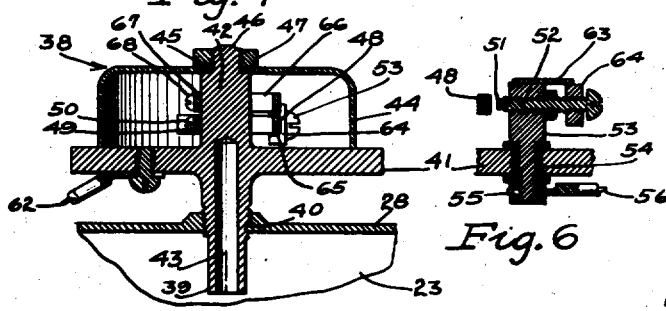
Fig. 5 is a sectional view of said thermostatic mechanisms, taken as on line 5—5 in Fig. 3.
Fig. 6 is a detail sectional view taken as on line 6—6 in Fig. 3.

With respect to the form of the invention disclosed in Figs. 1 to 7 of the drawings, 15 represents the body of an automotive vehicle having an engine provided with a water-circulating cooling system comprising a water jacket 16, a cooling radiator 17, a connection 18 between the water jacket and the cooling radiator, and a connection 19 between the cooling radiator and the water jacket, the connection 19 including an ordinary pump 20 for causing a circulation of water through the water cooling system, the passage of the water being from the water jacket 16 through the connection 18 to the cooling radiator 17, and from the cooling radiator through the connection 19 back to the water jacket.

Numeral 21 represents, generally, the heating element of the improved apparatus. As disclosed, said heating element includes water-circulating tubes 22 each opening at one end to a chamber 23 in which a fluid conducting member 24 is arranged, and each opening at its opposite end to a chamber 25 in which a fluid conducting member 26 is arranged, the manner in which the water-circulating tubes 22 are associated with the chambers 23 and 25 being more clearly disclosed in Fig. 2.

Numeral 27 represents spaced apart plates extending transversely of the water-circulating tubes 22 and having perforations through which said water-circulating tubes pass. Side portions of the casing 28 of the heating element are adjacent to or contiguous with the ends of the spaced apart plates 27 to provide air passages 29 between the plates and about the tubes 22 and within the confines of the four walls of the casing 28. The tubes 22 are desirably sealed in the perforations of the plates 27, and the ends of said tubes are sealed in the adjacent walls of the chambers 23 and 25.

The heating element 21 is situated within the body 15 of the automotive vehicle. It can be supported in said body in any suitable manner. As disclosed, the fluid conducting member 24 is a water inlet or connection to the heating element from an upper portion of the water jacket to the water-circulating cooling system, and the fluid conducting member 26 is a water outlet or connection from the heating element open to a part of the connection 19 in advance of the pump 20, in such manner that hot water from the water-circulating cooling system can be caused to pass through the chamber 23, the water-circulating tubes 22, and the chamber 25, to cause air made to travel through the air passages 29 to be heated. The passage of the water through the heating element as disclosed could of course be reversed. When the heating element is mounted adjacent the dash of an automotive vehicle, the water inlet or connection 24 and the water outlet or connection 26 may pass through the dash. Clearly, a different arrangement providing for circulation of all of the water of the engine cooling system through the water tubes of the heating element could be employed instead of the arrangement as described.

The relatively hot water of the water-circulating cooling system of the vehicle engine will, by its travel through the chambers 23 and 25 and the water-circulating tubes 22, cause said chambers and tubes to be heated and to in turn heat the spaced apart plates 27, and said heated tubes and plates will heat air forced to travel between the plates and about the tubes.

The heating element as disclosed includes a fan 30 adjacent an end of the air-circulating passages 29 adapted to the purpose of causing air to be forcibly circulated through said air passages. The fan 30 is supported upon the shaft 31 of a motor 32 itself suitably supported upon a shroud 33 held against the heating element casing 28 in any convenient manner, as by sleeves 34 upon tie-bolts 35 which, as shown, support the heating member upon a board, such as a dash board, 36. The shroud includes an integral support 37 upon which the motor is fastened. The tie-bolts 35 pass through flanged frames upon the heating element casing, one of the flanged frames including the shroud 33, and the sleeves 34 are situated between the dash board 36 and the adjacent flanged frame to space this flanged frame away from the dash board and to hold it against the heating element casing. Heads upon the tie-bolts hold the flanged frame opposite the dash board against the adjacent end of the heating element. See Figs. 1 and 2.

It will be evident that the fan 30 will cause air within the vehicle body interior to be circulated through the air-circulating passages 29, to thus be heated, and that the heated air will be continuously circulated within the vehicle body.

The heating apparatus includes a thermostatic control for the motor 32, and said thermostatic control is responsive to the temperature of the water in the water-circulating cooling system.

A unit 38 includes a hollow shank 39 which enters the chamber 23, the said shank desirably being removably threaded in a wall of said chamber as indicated at 40. A base plate 41, integral with the hollow shank 39, integrally supports a stud 42 which as shown is opposite the hollow shank 39. A concavity 43 in the hollow shank 39 is open at one of its ends to the chamber 23, and the other end of the concavity desirably terminates in the stud 42, at location beyond the face of the base plate 41 spaced from the chamber 23. The unit 38 also includes a cup shaped member 44 which, together with the base plate 41, houses parts, yet to be described, of the thermostatic control for the motor 32. As shown, the cup shaped member 44 has a central opening 45 which freely receives a reduced threaded extension 46 of the stud 42. A nut 47 on the threaded extension 46 removably attaches the cup shaped member upon the stud 42 so that the portion of said cup shaped member about its opening 45 engages a circumferential shoulder upon said stud and so that the open side of said cup shaped member is fitted against the adjacent face of the base plate 41.

A bi-metal strip 48, of suitable curvilinear comformation, has one of its ends 49 attached to the stud 42, as at 50, and its other end arranged adjacent to an end 51 of a contact element 52. The contact element 52 is adjustably mounted in a current conducting post 53 itself insulatively supported in the base plate 41, as indicated at 54. As shown, said contact element 52 is a screw adjustable in the post 53 to move the end of the contact element adjacent the bi-metal strip 48 toward and away from said bi-metal strip. The portion of the post 53 at the side of the base plate 41 opposite the contact element 52 is attached, as at 55, to a wire 56 leading to the motor 32. Numeral 57 represents a wire which leads from the motor 32 to a battery 58, the lead wire 57 including an ammeter 59 and a manual switch 60. The battery is grounded as at 61, and the stud 42 and the base plate 41 are grounded as at 62. Means for adjusting the end 51 of the contact element 52 at desired distance from the bi-metal strip 48 may consist of a pointer 63 attached to the upper part of the post 53 and ridable over a disc 64 fixed upon the contact element and having suitable graduations 65. See Figs. 3 and 6. The arrangement is made to be such that when the temperature of the water in the heating element 21 is below a predetermined temperature, the bi-metal strip 48 will be out of engagement with the contact element 52. The temperature at which the bi-metal strip engages the contact element is predetermined by rotative adjustment of the contact element in the post 53 and relatively to the bi-metal strip, closer to or further away therefrom. The graduations 65 upon the disc 64 serve as a means for making an accurate adjustment. In practice, the end 51 of the contact element 52 is set at sufficient distance from the bi-metal strip 48 to allow the motor 32 to remain inoperative until the water in the cooling system has reached a temperature high enough to be capable of supplying substantial heat to the air passages 29. When the water reaches such temperature, the motor 32 is automatically started to operate the fan 30. When the water falls below such temperature, the motor is de-energized to cease driving the fan. The manual switch 60 affords means for breaking the motor circuit independently of the thermostatic switch consisting of the bi-metal strip 48 and the contact element 52.

It will be apparent that when water is circulating through the heating element, water and hot air will enter the concavity 43 of the hollow shank 39, and that heat will thus be imparted to the stud 42 and the bi-metal strip 48. When said bi-metal strip 48 becomes heated to a sufficient extent to engage the contact element 52, a circuit will be made from the battery 58 through the lead wire 57 to the motor, through the motor and the lead wire 56 to the post 53, through the post and the contact element 52 to the bi-metal strip 48, and through said bi-metal strip and the stud 42 and the base plate 41 to the ground. Upon the breaking of contact between the bi-metal strip and the contact element, this circuit will be broken.

The heating apparatus also includes a second thermostatic control for making a discernible signal intended to be indicative to an operator of an automotive vehicle that the water in the water-circulating cooling system of the vehicle engine is above a predetermined temperature.

Numeral 66 represents a second bi-metal strip, which may be similar to the bi-metal strip 48, housed by the unit 38 and having one of its ends 67 attached, as at 68, to the stud 42, in spaced relation to the bi-metal strip 48, and its other end 69 disposed adjacent a contact element 70, which may be similar to the contact element 52, adjustably mounted in a current conducting post 71 itself insulatively supported in the base plate 41, as at 72, at location opposite the post 53 as shown. The contact element 70 is a screw movable in the post 71, and toward and from the bi-metal strip 66, in the same manner that the contact element 52 is movable toward and from the bi-metal strip 48, and for the same purpose, to space the end 73 of said contact element 70 at greater or less distance from the bi-metal strip 66. A disc 74 fixed on the contact element 70 has graduations 75 for the same purpose as the graduations 65 upon the disc 64; that is to say, to make an accurate adjustment of the contact element 70 toward and from the bi-metal strip 66. A portion of the post 71 at the side of the base plate 41 opposite the contact element 70 is attached, as at 76, to a wire 77 leading to a signal, such as a lamp, 78. A lead wire 79 attaches the signal or lamp 78 to the lead wire 57. A circuit is completed when the bi-metal strip 66 and the contact element 70 are in engagement, from the battery 58 through the lead wires 57 and 79 to the signal 78, through the lead wire 77 to the post 71, through the post 71 to the contact element 70, and through the bi-metal strip 66 and the stud 42 and the base plate 41 to the ground. The signal or lamp 78 can be supported upon the instrument board 80 in any ordinary or preferred manner.

In practice, the bi-metal strip 66 and the contact element 70 may be set apart a sufficient distance, by adjustment of the contact element with reference to the graduations 75 on the disc 74, to remain out of engagement until the temperature of the water in the water-circulating cooling system of the vehicle engine has reached a predetermined high temperature. When the water reaches such temperature, the bi-metal strip 66 and the contact element 70 will come into engagement to operate the signal; that is to say, to light the lamp 78. When the signal is discernible, the operator of the vehicle can move the cooling-radiator-shutters to open position, should said shutters be at the time closed. Then immediately upon the temperature of the water in the engine cooling system, and hence in the heating element, dropping below the predetermined temperature at which the thermostatic switch is set to operate, the bi-metal strip 66 will remove itself from the contact element 70 to break the circuit and render the signal undiscernible, as will be evident.

Referring to the form of the invention disclosed in Figs. 8 to 12, numeral 15 represents the body of an automotive vehicle including an engine having a water-circulating cooling system of about the same construction as the cooling system of the vehicle engine disclosed in Fig. 1. The heating element 21 of the present form of the invention is also of about the construction as already described, as are the water conveying connections between the heating element and the water-circulating cooling system. The motor and its fan of Figs. 8 to 12 may be supported upon the heating element in the manner as heretofore set forth.

In the instance of the present form of invention, the unit 38 which houses the thermostatic control mechanisms is supported in the connection 24, instead of in the heating element, and said unit is positioned outside of the vehicle body, beneath the hood as shown.

Numeral 81 represents a drum, desirably airtight, positioned about the connection 24 at any location along the length of said connection in intimate contact therewith. As shown more clearly in Figs. 10 and 11, the drum 81 is disposed upon a relatively thin metal coupling 82 between parts of the connection 24 of thicker dimension and having relatively greater heat insulating capacity. A bi-metal strip 83, positioned within the drum, has one of its ends 84 attached to the metal coupling 82, and the body of the bi-metal strip extends longitudinally of the length of the coupling in close proximity thereto. A contact element 85, which is adjustably mounted in an insulating plug 86 in the drum 81, has its inner end 87 situated adjacent the free end of the bi-metal strip 83 and its outer end disposed outside of the drum 81. As shown, the contact element 85 is a screw adjustable in the plug 86 to move its inner end toward and away from the bi-metal strip. The outer portion of the contact element 85 is attached, as at 88, to a wire 56 leading to the motor 32. Numeral 57 represents a wire which leads from the motor to the battery 58, the lead wire 57 including an ammeter 59, and a manual switch 60. The battery is grounded as at 61, and the drum 81 is grounded as at 62. The arrangement is such that when the temperature of the water in the connection 24 is below a predetermined temperature, the bi-metal strip 83 is out of engagement with the contact element 85. The temperature at which the bi-metal strip engages the contact element is predetermined by adjustment of the contact element relatively to the bi-metal strip, closer to or further away therefrom. In practice, the contact element is set at sufficient distance from the bi-metal strip to allow the motor 32 to remain inoperative until the water in the cooling system has reached a temperature high enough to be capable of supplying substantial heat to the air-circulating passages 29. When the water reaches such temperature, the motor 32 is automatically started to operate the fan. When the water falls below such temperature the motor is deenergized to cease driving the fan. As before, the manual switch 60 affords means for breaking the motor circuit independently of the thermostatic switch.

When the bi-metal strip 83 and the contact element 85 are in engagement, a circuit is completed from the battery 58 through the lead wire 57 to the motor 32, through the motor and the lead wire 56 to the contact element 85, and through the bi-metal strip 83 and the metal coupling 82 and the drum 81 to the ground.

The thermostatic control for making a discernible signal, intended to be indicative of the fact that the water in the water-circulating cooling system of the vehicle engine is above a predetermined temperature, includes a second bi-metal strip 89 in the drum 81 and having one of its ends 90 attached to the metal coupling 82 and its body extending longitudinally of the length of the coupling in close proximity thereto. A contact element 91, similar to the contact element 85, is adjustably mounted in an insulating plug 92 in the drum 81 to be moved toward and away from the bi-metal strip 89 in the same manner that the contact element 85 is moved toward and away from the bi-metal strip 83, and for the same purpose, to space the inner end 93 of the contact element 91 at greater or less distance from the bi-metal strip 89. The outer portion of the contact element 91 is attached, as at 94, to a wire 77 leading to a signal, such as a lamp, 78. A lead wire 79 connects the signal or lamp with the lead wire 57. A circuit is completed, when the bi-metal strip 89 and the contact element 91 are in engagement, from the battery 58 through the lead wire 57 to the lead wire 79, through the lead wire 79 to the signal or lamp 78, from the signal or lamp through the lead wire 77 to the contact element 91, and through the bi-metal strip 89 and the metal coupling 82 and the drum 81 to the ground.

As in the form of the invention of Figs. 1 to 7, the bi-metal strip 89 and the contact element 91 will be set apart a sufficient distance, by adjustment of the contact element, to remain out of engagement until the temperature of the water in the water-circulating cooling system of the vehicle engine, and hence in the water-circulating system of the heating apparatus, has reached a predetermined high temperature. When the water reaches such temperature, the bi-metal strip 89 and the contact element 91 will come into engagement to operate the signal. When the temperature of the water drops below the predetermined temperature at which the thermostatic switch is set to operate, the bi-metal strip 89 will remove itself from the contact element 91 to break the circuit and render the signal undiscernible.

It will be evident that hot water upon passing through the metal coupling 82 will impart its heat to the bi-metal strips 83 and 89 in the drum 81, and said bi-metal strips will readily respond to the temperature of the water in the connection 24. The drum 81 effectively insulates the bi-metal strips so that they will not be affected by changes in the outside atmosphere.

I claim as my invention:

In an automotive vehicle in combination an engine having a water circulating cooling system, a heating element, connections for circulating water of said cooling system through said heating element, electrically operable means for causing air to contact with the heating element and to be thereafter circulated in the vehicle body, a pair of thermostatic switches the first adapted to close when the temperature of the water of the cooling system is sufficiently hot, and the second to close when the water is too hot, a battery circuit in which said thermostats are arranged in parallel, the circuit of the first switch including therein said electrically operable means and the circuit of the second switch including therein a signal device disposed to be visible to the driver.

LEONARD D. NILSON.